Patented May 31, 1932

1,860,651

UNITED STATES PATENT OFFICE

CHARLES E. BRADLEY AND CLAUDE D. MASON, OF MISHAWAKA, INDIANA, ASSIGNORS TO MISHAWAKA RUBBER AND WOOLEN MANUFACTURING COMPANY, OF MISHAWAKA, INDIANA, A CORPORATION OF INDIANA

WATERPROOFED LEATHER AND COMPOSITION FOR TREATING SAME

No Drawing.   Application filed December 3, 1925. Serial No. 73,054.

Our invention relates to compositions containing rubber, and the methods of making and using same, for waterproofing and finshing leather and the like and also includes the products resulting from treatment with these compositions.

Rubber compositions which have been used heretofore for proofing leather, and the like, have been either in the nature of rubber cements, obtained by dissolving crude rubber in volatile solvents, or compositions obtained by mixing rubber with oils. These proofing compositions not only are lacking in their waterproofing properties, due to the small proportion of the waterproofing ingredient,—rubber,—which they will take into solution but they are of such a character that they do not readily penetrate the material to be impregnated and in practice the greater proportion of the rubber is filtered out and remains on the surface of the material.

The principal objects of our invention are to provide a composition for proofing leather, and the like which may be made with a large percentage of rubber; to avoid the filtering action which occurs in waterproofing with the present rubber compounds; to cause the rubber in the composition to freely penetrate and thoroughly permeate leather, and the like; to provide a composition which is stable on exposure, has a preservative action on leather and serves to protect same against the injurious effects of wetting and drying in service and other conditions of use or exposure; to maintain the required degree of plasticity of the compound throughout a wide range of temperatures; to provide a composition whereby the surface of leather, and particularly those of inferior grades may be greatly improved; to produce waterproofed materials superior to those heretofore available; and in general to provide a simple, convenient and effective treatment for waterproofing leather, and the like.

The composition which we use for waterproofing is in the form of an emulsion, using rubber latex as a source of rubber to which paraffin in the form of a gasoline solution is added together with a small quantity of paraffin oil. A suitable mixture of this nature may be made up of the following:

Rubber latex_____ 100 c. c.
Gasoline _____ 100 c. c.
Paraffin wax_____ 25 grams
Paraffin oil_____ 10 grams
10% soap solution_____ 50 c. c.

The wax is dissolved in the gasoline and paraffin oil, and the soap solution is added to the latex after which the mixture of gasoline, wax and paraffin oil is introduced gradually into the combined latex and soap solution with vigorous stirrings.

This gives a composition of substantially the proper consistency for ordinary waterproofing purposes and having high penetration characteristics. The rubber in this form freely permeates leather and like materials without being filtered out and left on the surface as is the case with the ordinary solutions of crude rubber in solvents and on account of this penetrating capability of the rubber in this form of composition, a highly effective waterproofing occurs. The residue of the composition which remains in the leather after the solvent has evaporated in sufficiently plastic to preserve the softness or pliability of the leather and its plasticity is not materially affected by usual changes in temperature and it therefore does not become stiff when subjected to cold or too soft when subjected to heat. It is not affected by atmospheric oxidizing agents and its adhering properties are such that it is not washd out by wetting and drying of the impregnated material, in service, as are the waterproofing compositions commonly used.

In treating leather with this composition we have found that the composition is adapted to serve the purpose of keeping the leather soft and pliable as readily as the oils and greases which are used in the ordinary tanning processes of stuffing and filling, and we, therefore, prefer to take the leather before it is stuffed or filled in the usual manner and treat the unfilled leather with this present composition so that the latter serves as the stuffing or filling for the leather. This treatment in addition to its property of making the leather soft and pliable, renders the leather more or less impervious to water and moisture according to the intensity of the impregnation, which may be controlled by modifying the compound or shortening the treatment. This composition serves to protect the leather against rotting action incident to alternate wetting and drying in service and avoids the injurious effects of perspiration, barnyard acids and the like. The composition is not affected by atmospheric oxidizing agents, retains its plasticity and maintains the leather in a soft, pliable condition over a wide range of temperature, adheres to the leather sufficiently so that it does not wash out and moreover leather treated with this composition is inert in its action on vulcanized rubber and avoids the decomposition of rubber which takes places when leather produced by the ordinary tanning process and filled or stuffed with oils and greases comes in contact with vulcanized rubber as in the case of shoes which are made partly of rubber and partly of leather.

Rubber latex alone, which is an emulsion, may be used for waterproofing or filling the leather, the latex being diluted as required to obtain the desired impregnation. Moreover the latex in any form in which it is used may be vulcanized before or after impregnation.

In connection with compositions of this character involving rubber we have found that a finishing composition or dressing having the property of improving the appearance of the leather may be satisfactorily used, this being particularly desirable in connection with leathers of inferior grades such as split leather which is particularly undesirable for use in many cases on account of its rough and unfinished appearance.

The compositions which we have found particularly effective for this purpose contain nitrocellulose solutions (commercial duco). Nitrocellulose solutions when evaporated give a perfectly smooth celluloid like "feel" but these solutions are brittle and will not stand flexing. By introducing a certain proportion of rubber into this nitrocellulose we preserve in part the desirable smooth "feel" of the nitrocellulose and at the same time improve its flexibility by means of the rubber. This nitrocellulose and rubber composition has the property of uniting with the leather when the latter is treated with a rubber proofing or filling composition and affords a durable finish which greatly improves the appearance of the leather and gives to the leather a "feel" similar to the grain surfaces of the higher grades of leather. It is possible to make compositions of nitrocellulose and rubber by using rubber latex in the one case as a source of rubber or rubber cement in the other case.

A composition of this character using latex may be made up according to the following formula:

| | |
|---|---|
| Nitrocellulose solution (commercial duco) | 50 c. c. |
| Latex | 20 c. c. |
| Nitrocellulose thinner | 50 c. c. |
| Water | 100 c. c. |
| Castor oil | 2 c. c. |

A satisfactory composition for this purpose may be made up with rubber cement according to the following formula:

| | |
|---|---|
| Nitrocellulose solution (commercial duco) | 50 c. c. |
| 10% rubber cement | 20 c. c. |
| Thinner | 50 c. c. |

The thinners or solvents used for nitrocellulose products which may be used in the above compositions are, amyl acetate, ethyl acetate or butyl acetate. Benzol and alcohol mixture which is a common solvent for nitrocellulose and rubber may be used.

In using these nitrocellulose compositions the leather is first treated or impregnated with the waterproofing composition containing rubber and after the waterproofing treatment is completed a coating of the nitrocellulose composition or dressing is applied to the surface of the leather. When the solvent in the nitrocellulose composition evaporates a surface finish remains on the leather which is not impaired by flexing the leather and which gives to the leather a smooth finished appearance and the "feel" which is a desirable characteristic of leather when used in articles such as shoes and other kinds of footwear.

While we have described our invention in a preferred form, we are aware that various changes and modifications may be made without departing from the principles of our invention the scope of which is to be determined by the appended claims.

We claim:

1. A leather waterproofing penetrating liquid of substantially the following formula: 100 c. c. rubber latex, 100 c. c. gasoline, 25 grams paraffin wax, 10 grams paraffin oil and 50 c. c. of a 10% soap solution.

2. The method of treating leather which comprises impregnating the leather with a composition comprising rubber latex, wax and a solvent.

3. The method of treating leather which comprises impregnating the leather with a composition containing substantially 100 c. c. rubber latex, 100 c. c. gasoline, 25 grams paraffin wax, 10 grams paraffin oil, and 50 c. c. of a 10% soap solution.

4. The art of treating leather which comprises impregnating unfilled leather with a composition of rubber latex, wax and a wax solvent.

5. The art of treating leather which comprises impregnanting unfilled leather with a rubber latex and wax emulsion.

CHARLES E. BRADLEY.
CLAUDE D. MASON.